United States Patent
Leber et al.

(10) Patent No.: US 8,613,207 B2
(45) Date of Patent: Dec. 24, 2013

(54) METHOD AND APPARATUS FOR PRODUCING A QUARTZ GLASS CYLINDER

(75) Inventors: Helmut Leber, Hanau (DE); Rainer Berg, Langenselbold (DE); Nigel Whippey, Seligenstadt (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 424 days.

(21) Appl. No.: 12/737,302

(22) PCT Filed: Jun. 25, 2009

(86) PCT No.: PCT/EP2009/057962
§ 371 (c)(1),
(2), (4) Date: Jan. 19, 2011

(87) PCT Pub. No.: WO2009/156467
PCT Pub. Date: Dec. 30, 2009

(65) Prior Publication Data
US 2011/0113829 A1     May 19, 2011

(30) Foreign Application Priority Data
Jun. 27, 2008   (DE) .................. 10 2008 030 115

(51) Int. Cl.
*C03B 15/14* (2006.01)

(52) U.S. Cl.
USPC .................. 65/86; 65/87; 65/187; 65/439

(58) Field of Classification Search
CPC ............................... C03B 15/14; C03B 17/04
USPC ....................... 65/439, 187, 86, 87
See application file for complete search history.

(56) References Cited

U.S. PATENT DOCUMENTS

| 2,464,028 A | 3/1949 | Danner |
| 2,486,737 A | 11/1949 | Danner |

(Continued)

FOREIGN PATENT DOCUMENTS

| DE | 1 208 046 B | 12/1965 |
| DE | 1 596 664 A1 | 3/1971 |

(Continued)

OTHER PUBLICATIONS

Espacenet English language abstract of JP10287435 (A) published Oct. 27, 1998.

(Continued)

*Primary Examiner* — Joseph S. Del Sole
*Assistant Examiner* — Russell Kemmerle, III
(74) *Attorney, Agent, or Firm* — Tiajoloff and Kelly LLP (57) ABSTRACT

In a known method for drawing a tubular quartz glass strand, $SiO_2$-containing starting material is fed to a melting crucible, softened therein into a viscous quartz glass mass (27), and said mass is pulled vertically downward as a cylindrical quartz glass strand (5; 33) through a die (4; 34) provided in the bottom region of the melting crucible (1), said die having a gap-shaped outlet (25; 36), which is defined by a bottom opening and a die inside part, and thereafter the quartz glass cylinder is cut to length. In order to provide a method starting from this which facilitates the production of homogeneous quartz glass cylinders, even if the lateral dimensions thereof are in the range of the inside diameters of conventional melting crucibles (1), according to the invention the viscous quartz glass mass is drawn over a flow constriction (12; 32) provided in an upper region of the die (4; 34) and leading downward into the outlet (25; 36) via a flow channel, said region facing the crucible interior, wherein the outlet has an opening width that is larger than the width of the flow constriction (12; 32), and wherein a first minimum circumscribed circle around the flow constriction (12; 32) has a diameter that is a maximum of 30% of the diameter of a second minimum circumscribed circle around the quartz glass strand (5; 33) to be drawn. The invention further relates to a corresponding apparatus.

20 Claims, 3 Drawing Sheets

(56) References Cited

U.S. PATENT DOCUMENTS

| | | | |
|---|---|---|---|
| 3,035,371 A * | 5/1962 | Zangari et al. | 65/161 |
| 3,249,417 A | 5/1966 | Van Zonneveld | |
| 3,269,821 A | 8/1966 | Vatterodt | |
| 3,508,900 A | 4/1970 | Loughridge et al. | |
| 3,764,286 A | 10/1973 | Antczak et al. | |
| 2001/0055930 A1 * | 12/2001 | Ott et al. | 445/9 |
| 2005/0227027 A1 * | 10/2005 | Maenner et al. | 428/34.4 |
| 2006/0260360 A1 * | 11/2006 | Dick et al. | 65/60.53 |
| 2009/0047454 A1 * | 2/2009 | Maenner et al. | 428/34.4 |
| 2009/0064715 A1 | 3/2009 | Horn et al. | |
| 2011/0183138 A1 * | 7/2011 | Trommer et al. | 428/338 |

FOREIGN PATENT DOCUMENTS

| | | |
|---|---|---|
| DE | 22 17 725 B | 8/1974 |
| DE | 10 2006 011 579 A1 | 9/2007 |
| JP | 10 287435 A | 10/1998 |
| JP | 2002 211934 A | 7/2002 |
| WO | WO 2006/015763 A | 8/2005 |

OTHER PUBLICATIONS

Espacenet English language abstract of JP2002211934 (A) published Jul. 3, 2002.

* cited by examiner

METHOD AND APPARATUS FOR PRODUCING A QUARTZ GLASS CYLINDER

The present invention refers to a method for drawing a quartz glass cylinder, in which $SiO_2$-containing start material is supplied to a melting crucible, softened therein into a viscous quartz glass mass, and said mass is pulled vertically downwards as a cylindrical quartz glass strand through a draw die which is provided in the bottom region of the melting crucible and has a gap-shaped outlet which is defined by a bottom opening and an interior part of the draw die, and the quartz glass cylinder is cut therefrom to length.

Furthermore, the present invention refers to an apparatus for drawing a quartz glass cylinder, comprising a melting crucible for receiving $SiO_2$-containing start material, which includes a crucible interior defined by a sidewall and a bottom region, comprising a heating device for softening the start material, and comprising a draw die provided in the bottom region of the melting crucible and including a gap-shaped outlet.

PRIOR ART

Vertical type crucible pulling methods are used for producing cylindrical components, particularly tubes or plates of quartz glass having any desired cross-sectional profile. $SiO_2$ granules are melted as glass start material in a melting crucible to obtain a quartz glass mass of relatively high viscosity (hereinafter also called "quartz glass melt") and are drawn off via a nozzle on the crucible bottom as a glass strand.

Particular attention is paid that inhomogeneities in the drawn-off glass strand are avoided and that melting conditions that are as uniform and constant as possible are created in the crucible interior. Due to its high temperature and viscosity, however, a quartz glass melt cannot be homogenized by means of techniques that are standard in low-viscosity glass melts, such as e.g. borosilicate glass melts or soda-lime glass melts. To be more specific, stirrers used for refining such glass melts are not suited for homogenizing a quartz glass melt because bubbles formed during stirring cannot be eliminated any more in the course of the drawing process because of the high viscosity.

The attempt is therefore made to accomplish a fusion of the glass start materials that is as uniform as possible with the help of a particularly adapted axial temperature curve in the drawing furnace (DE 22 17 725 B) or uniform and constant fusion conditions through a reproducible distribution and compaction of the $SiO_2$ granules to be fused on the melt surface (U.S. Pat. No. 3,249,417 A; WO 2006/015763 A).

It has also been suggested that the flows of the viscous quartz glass melt should be guided or steered for the purpose of homogenizing the temperature. A method of this type is described in DE 1 596 664 OS, which also discloses an apparatus of the above-mentioned type. For drawing a tubular quartz glass strand from a melting crucible, a tungsten nozzle is used, which is formed by an inner collar fastened to the furnace wall and by a mandrel which is held in the quartz glass melt while suspended from a hollow shaft of tungsten. The position of the mandrel is variable. To this end the upper end of the shaft is held on a positioning device. The mandrel has an upper member with a bulge in the form of an hourglass which is connected via an intermediate ring to a frustoconical bottom part that extends up and into the opening formed by the inner collar while keeping an annular gap of variable width. Due to the geometry of the top part the central and colder melt flows are deflected, whereby the temperature is homogenized inside the quartz glass melt.

The known method, however, is not unreservedly suited to draw tubular or plate-shaped quartz glass cylinders having large lateral dimensions. This shall now be explained in more detail with reference to a quartz glass cylinder in the form of a quartz glass tube. The diameter of the drawn-off tube and its wall thickness are determined by the geometry of the draw die, the viscosity of the glass in the region of the draw die and/or by the drawing speed. It is standard practice to pass a gas stream into the tube, so that due to the blowing pressure inside the tube a further parameter is available for expanding the tube diameter. Such an expansion, however, is only possible within limits. The reason is that with an increasing tube diameter greater gas volumes must be introduced for maintaining the desired diameter, said gas volumes cooling the inner wall of the tube and rendering the drawing process difficult. The maximally possible diameter of the tube to be drawn is therefore primarily defined by the dimension of the draw die, so that for the manufacture of quartz glass tubes with large outer diameters correspondingly large draw dies must be employed. However, the more the draw die width approaches the inner diameter of the furnace chamber, the more does the draw die promote and support a flow of the quartz glass melt in the edge region of the furnace. Said edge flow, which in its melting conditions and thus in its composition and viscosity differs considerably from the more central melt streams, can thus directly exit through the draw die, so that the quartz glass tubes obtained in this way may show significant inhomogeneities in their composition and density. This situation can hardly be changed by deflecting the central melt streams, which is possible with the known method.

In DE 1 208 046 PS it is intended to obtain a small, if possible rotation-symmetrical, drawing bulb when a quartz glass tube is drawn from the melting crucible. For this purpose it is suggested that a ring plate having a thickness of 15 mm should be arranged above the draw die, the plate having the same inner diameter as the draw die and being provided with six inwardly oriented teeth. The teeth effect a minor deflection of the flow when the quartz-glass melt exits out of the nozzle.

Similar devices effecting just a minor flow deflection of the quartz glass melt can also be gathered from U.S. Pat. Nos. 2,486,737 A and 2,464,028 A.

US 2005/0227027 A1 discloses a method for producing a glass tube with a particular inner and/or outer profile. To this end fused glass is continuously taken via a bottom outlet from a melting trough, guided over a shaping body, whereby a hollow parison is formed, and said parison is pulled downwards over a further profile arranged further below. The diameter of the drawn-off strand is about as large as the minimum opening width of the bottom outlet.

TECHNICAL OBJECT

It is therefore the object of the present invention to provide a method which facilitates the manufacture of homogeneous quartz glass cylinders even if their lateral dimensions are in the range of the inner diameters of standard melting crucibles, particularly quartz glass tubes having an outer diameter of more than 200 mm or quartz glass plates having a width of more than 200 mm.

Furthermore, it is the object of the present invention to provide an apparatus suited for performing the method.

As for the apparatus, this object, starting from the above-mentioned apparatus, is achieved according to the invention in that in an upper region of the draw die which faces the crucible interior, a flow constriction is provided that terminates downwards via a flow channel in the outlet, which has an opening width larger than the width of the flow constriction, and wherein a first enveloping circle around the flow constriction has a diameter that is not more than 30% of the diameter of a second enveloping circle around the quartz glass strand to be drawn off.

It is the objective of the invention to avoid a pronounced edge flow with direct entry of marginally homogenized quartz glass mass into the draw die, as may occur in the case of large draw die dimensions. To this end the interaction of several measures is decisive:

1. An opening which acts as a flow constriction is provided in an upper region of the draw die. The viscous glass mass is forced through this opening. The opening acts as a flow obstacle for the edge flow and promotes a flow in the rather central region of the melting crucible which is distinguished by a comparatively uniform temperature distribution and a homogeneous chemical composition. At any rate, it induces a thorough mixing of the quartz glass mass to a certain extent. The maximum width of the flow constriction is defined by the diameter of a first enveloping circle around the flow constriction.
2. In contrast to the known apparatus the flow constriction is not intended to assist in the setting of the cross-sectional profile and particularly of the outer dimension of the quartz glass strand to be drawn off. The gap-shaped outlet is provided for this purpose, the outlet being configured as a simple longitudinal gap for the production of a quartz glass plate and as an annular gap for the production of a quartz glass tube. Hence, the outlet considerably defines the lateral dimensions of the quartz glass strand (these are the dimensions perpendicular to the draw axis). Thus the maximum width of the outlet is of relevance in the production of a quartz glass plate for the long plate width and in the production of a quartz glass tube for the outer diameter of said tube. The maximum width of the outlet is greater than the opening width of the flow constriction. As a consequence, at least part of the glass mass exiting over the flow constriction is deflected to the outside via the flow channel which terminates in the outlet. Hence, owing to the deflection of the mass flow to the outside, the homogeneous quartz glass mass which is substantially taken from the central region of the melting crucible—and not the quartz glass mass originating from the edge region—passes via the flow channel into zones located radially further outwards.
3. The blending and homogenizing effect of the apparatus according to the invention is the more pronounced, the smaller the flow constriction is in comparison with the maximum lateral dimensions of the drawn-off quartz glass strand. This maximum lateral dimension is defined by the diameter of a second enveloping circle around the quartz glass strand. According to the invention it is intended that the first enveloping circle around the flow constriction is not more than 30% of the diameter of the second enveloping circle. In the simplest case the flow constriction is circular, which is also conducive to a substantially rotation-symmetrical inflow of the quartz glass mass into the cavity. In this case the first enveloping circle around the flow constriction conforms to the diameter of the flow constriction. Otherwise, the first enveloping circle conforms to the smallest possible circular ring around the flow constriction. The blending effect is particularly advantageously noticed when the difference between the maximum lateral dimension of the quartz glass strand to be drawn off and the diameter of the flow constriction in the region of the outlet of the quartz glass mass is great, i.e. in a quartz glass tube having a large outer diameter or in a quartz glass plate having a large plate width and, in comparison therewith, a small opening width of the flow constriction. In the case of a flow constriction with opening diameters of clearly more than 30% of the maximum lateral dimensions of the quartz glass strand a blending effect is hardly noticed any more. On the other hand, the opening width of the flow constriction is also important for the throughput of quartz glass mass. Therefore, small opening widths of the flow constriction in the range below 5%, in relation to the maximum lateral dimension of the quartz glass strand, are disadvantageous for the productivity of the drawing process.

If here and in the following text mention is made of the "opening width of the flow constriction", this refers to the opening width upon exit into the flow channel. Since in the apparatus according to the invention the lateral dimensions of the quartz glass cylinder are set independently of the flow constriction, their geometry is in this respect only of minor importance. This geometry may e.g. be configured to be annular, circular, oval or polygonal. The flow constriction can also be formed by a plurality of openings (e.g. as a perforated plate); in this case the circumferential circle enveloping all openings is here defined as the first enveloping circle. Likewise, the geometry of the flow constriction above the flow channel is of little relevance in relation to the final dimensions of the quartz glass strand. For instance, the width of the flow constriction, viewed in drawing direction, may be constant, decreasing or increasing in front of the flow channel.

It is important that the opening width of the flow constriction upon exit of the viscous quartz glass mass into the flow channel is small enough to implement a significant deflection of the quartz glass mass flow to the outside.

Thus the apparatus according to the invention enforces a deflection of the flow of the viscous quartz glass mass in front of and after the flow constriction that prevents a pronounced edge flow and is conducive to a thorough mixing of the quartz glass mass, so that even if quartz glass cylinders of a large outer diameter are drawn, inhomogeneities in terms of density and temperature distribution of the quartz glass mass entering into the draw die are eliminated or reduced.

In a preferred embodiment of the apparatus according to the invention, it is intended that the flow constriction extends in a region around a central axis of the crucible interior.

Since the blending and homogenizing effect of the apparatus according to the invention is the more pronounced, the closer the flow constriction is arranged to the central axis inside the crucible interior and the smaller its opening width is, an embodiment of the apparatus is preferred in which the flow constriction has an opening cross-section the area of which is less than 10%, preferably less than 50%, of the radial cross-sectional area of the crucible interior.

In the case of a flow constriction having an opening cross-section of distinctly more than 10% of the radial cross-sectional area of the crucible interior, the edge flow can pass relatively unhindered into the flow constriction, resulting in a relatively small homogenizing and blending effect.

In this context it has also turned out to be particularly advantageous when the first enveloping circle around the flow constriction has a diameter that is not more than 20% of the diameter of the second enveloping circle.

In a particularly preferred configuration of the apparatus according to the invention for drawing a tubular quartz glass cylinder a draw die is provided with an outlet shaped in the form of an annular gap, which is defined by a bottom opening and an interior part of the draw die, with the flow constriction terminating downwards in a cavity and the interior part of the draw die comprising a mandrel which projects into the cavity while keeping the flow channel and which has a maximum outer circumference greater than the width of the flow constriction.

In contrast to the known apparatus the flow constriction is not intended to take part in the setting of the outer diameter of the tubular quartz glass strand to be drawn off. Instead of this, it terminates downwards into a cavity of the crucible bottom in which a one-part or multi-part mandrel projects from above or from below. The mass flow exiting downwards out of the flow constriction passes into the cavity and impinges on the surface of the mandrel.

The mandrel is characterized in that it has a region with a maximum outer diameter larger than the opening width of the flow constriction. Hence, the region with the maximum outer diameter is provided underneath the flow constriction, whereby the glass mass exiting through the flow constriction is deflected to the outside, namely around the mandrel, into the flow channel formed between the mandrel and the crucible sidewall. A component which is arranged on the inner wall of the crucible and is connected to this wall and which projects into the crucible interior is also regarded as a crucible sidewall within this meaning. Hence, owing to the deflection of the mass flow to the outside, the homogeneous quartz glass mass which is substantially taken from the central region of the melting crucible passes via the flow channel into zones located radially further to the outside and terminates in the annular gap-shaped outlet of the draw die that decisively determines the radial dimensions of the quartz glass tube.

It is essential that the opening width of the flow constriction upon exit of the viscous quartz glass mass into the cavity should be smaller than the maximum circumference of the mandrel, so that a deflection of the quartz glass mass flow to the outside can be carried out. The mandrel section projecting into the cavity is normally configured in rotational symmetry with the draw axis and is decisively defined in that it permits a flowing off of the viscous quartz glass mass to the outside and that it has a maximum circumference (viewed in the radial direction around the draw axis) that is greater than the opening width of the flow constriction.

The mandrel can here be held by means of a shaft that extends through the crucible interior, and the option of a "fingerless self-centering" is here particularly considered as is described in DE 10 2006 011 579 A1. In another preferred embodiment of the apparatus according to the invention, the mandrel is held on at least one web or is centered by means of said web, which web extends from the crucible sidewall to the mandrel.

The mandrel is here held or centered on the sidewall of the crucible by means of one web or a plurality of webs bridging the flow channel. This type of mounting of the mandrel has the advantage that a shaft extending from above through the whole crucible interior is not needed for holding the mandrel.

In an alternative and equally preferred embodiment of the apparatus, the mandrel is held on at least one web or is centered by means of said web, which extends from the edge of the flow constriction to the mandrel or to an upwardly projecting extension of the mandrel.

The mandrel is here also held or centered on a web or on a plurality of webs. The webs, however, extend in the region of the flow constriction, so that they only require a short length for bridging the path up to the mandrel. Moreover, in the region of the flow constriction the viscosity of the quartz glass mass is relatively low so that inhomogeneities of the flow caused by the mass flowing around the holding or centering webs will again disappear relatively rapidly. However, in order reduce the opening cross-section of the flow constriction by one or a plurality of webs not too much, the webs in this region are preferably made quite thin and are only intended for centering the mandrel or an upwardly projecting extension of the mandrel, such as e.g. a shaft.

In a particularly preferred configuration of the two last-explained embodiments of the apparatus of the invention, it is intended that the web is formed as a hollow web and is connected to a gas supply line formed in the mandrel for the supply of a gas into the inner bore of the drawn-off quartz glass tube.

This embodiment permits a gas supply through the hollow web into the mandrel and from there into the inner bore of the quartz glass tube to be drawn off. The gas supply can be used for setting a blowing pressure in the inner bore of the tube. In combination with other web connections the hollow web can simultaneously serve to hold the mandrel.

As for the method for drawing a quartz glass cylinder, the above-mentioned object, starting from a method of the aforementioned type, is achieved according to the invention in that the viscous quartz glass mass is drawn over a flow constriction which is provided in an upper region of the draw die facing the crucible interior and which terminates downwards via a flow channel in the outlet, wherein the outlet has an opening width greater than the width of the flow constriction, and wherein a first enveloping circle around the flow constriction has a diameter that is not more than 30% of the diameter of a second enveloping circle around the quartz glass strand to be drawn off.

It is the objective of the method to avoid a pronounced edge flow with a direct entry of marginally homogenized quartz glass mass into the draw die, as may occur in the case of large draw die dimensions. To this end the interaction of several measures is decisive:

1. An opening which acts as a flow constriction is provided in an upper region of the draw die. The viscous glass mass is forced through this opening. The opening acts as a flow obstacle for the edge flow and promotes a flow in the rather central region of the melting crucible which is distinguished by a comparatively uniform temperature distribution and a homogeneous chemical composition. At any rate, it induces a thorough mixing of the quartz glass mass to a certain extent.

2. In contrast to the known method the flow constriction is not intended to play a major role in the setting of the outer dimension of the quartz glass strand to be drawn off. Rather, the gap-shaped outlet is provided for this purpose. The outlet is configured as a simple longitudinal gap for the production of a quartz glass plate and as an annular gap for the production of a quartz glass tube. The outlet substantially defines the cross-sectional profile of the quartz glass strand (i.e. its dimensions perpendicular to the draw axis). Thus the maximum width of the outlet is of relevance in the production of a quartz glass plate for the long plate width and in the production of a quartz glass tube for the outer diameter thereof. The maximum width of the outlet is greater than the opening width of the flow constriction. As a consequence, at least part of the glass mass exiting over the flow constriction is deflected to the outside via the flow channel which terminates in the outlet. Hence, owing to the deflection of the mass flow to the outside, the homogeneous quartz glass mass which is substantially taken from the central region of the melting crucible—and not the quartz glass mass originating from the edge region—passes via the flow channel into zones located radially further outwards.

3. In the method according to the invention, the blending and homogenizing effect is the more pronounced, the smaller the flow constriction is in comparison with the maximum lateral dimensions of the drawn-off quartz glass strand. This maximum lateral dimension is defined by the diameter of a second enveloping circle around the quartz glass strand. According to the invention it is intended that the first enveloping circle around the flow constriction is not more than 30% of the diameter of the second enveloping circle. In the simplest case the flow constriction is circular, which is also conducive to a substantially rotation-symmetrical inflow of the quartz glass mass into the cavity. In this case the first enveloping circle around the flow constriction conforms to the diameter of the flow constriction. Otherwise, the first enveloping circle conforms to the smallest possible circular ring around the flow constriction. The blending effect is particularly advantageously noticed when the difference between the maximum lateral dimension of the cylindrical quartz glass strand to be drawn off and the diameter of the flow constriction in the region of the outlet of the quartz glass mass is great, i.e. in a quartz glass tube having a large outer diameter or in a quartz glass plate having a large plate width and, in comparison therewith, a small opening width of the flow constriction. In the case of a flow constriction with opening diameters of clearly more than 30% of the maximum lateral dimensions of the quartz glass strand a blending effect is hardly noticed any more. On the other hand, the opening width of the flow constriction is also important for the throughput of quartz glass mass. Therefore, small opening widths of the flow constriction in the range below 5%, in relation to the maximum lateral dimension of the quartz glass strand, are disadvantageous for the productivity of the drawing process.

Since the lateral dimensions of the quartz glass strand are set independently of the flow constriction, its geometry is in this respect only of minor importance, as has already been explained further above with reference to the apparatus according to the invention. It is essential that the opening width of the flow constriction upon exit of the viscous quartz glass mass into the flow channel should be small enough for implementing a deflection of the quartz glass mass flow to the outside.

Thus the method according to the invention effects a deflection of the flow of the viscous quartz glass mass after the flow constriction that prevents a pronounced edge flow and is conducive to a thorough mixing of the quartz glass mass, so that even if quartz glass cylinders of a large outer diameter are drawn, inhomogeneities in terms of density and temperature distribution of the quartz glass mass entering into the draw die are eliminated or reduced.

Advantageous variants of the method according to the invention follow from the sub-claims. Insofar as variants of the method indicated in the sub-claims copy the embodiments indicated in sub-claims regarding the apparatus according to the invention, reference is made for supplementary explanation to the above observations regarding the corresponding apparatus claims.

EMBODIMENT

The invention shall now be explained in more detail with reference to embodiments and a drawing. In the drawing, there is shown in detail in FIG. 1 a melting furnace with a draw die according to the invention in a first embodiment, in a schematic illustration.

Figure 1:
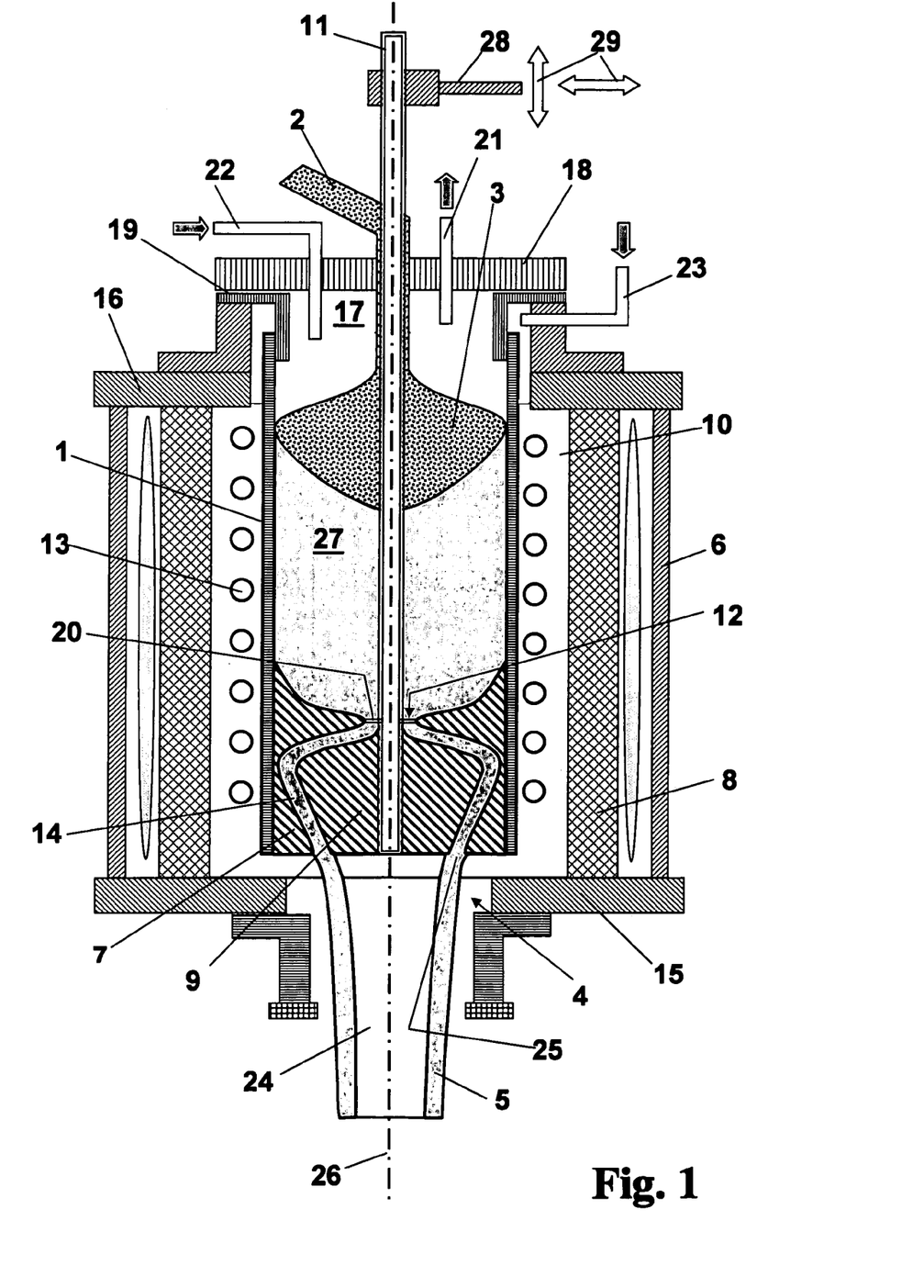

The drawing furnace according to FIG. 1 comprises a melting crucible 1 of tungsten into which $SiO_2$ granules 3 are continuously filled from above via a supply nozzle 2. The melting crucible 1 is surrounded by a water-cooled furnace jacket 6 with formation of a protective gas chamber 10 purged with protective gas, which accommodates a porous insulation layer 8 of oxidic insulation material and a resistance heater 13 used for heating the $SiO_2$ granules 3. The protective gas chamber 10 is open downwards and otherwise sealed to the outside with a bottom plate 15 and with a cover plate 16. The melting crucible 1 encloses a crucible interior 17 which is also sealed relative to the surroundings by means of a cover 18 and a sealing element 19. An inlet 22 and an outlet 21 for a crucible interior gas in the form of pure hydrogen project through the cover 18. Likewise, the protective gas chamber 10 is provided in the upper region with a gas inlet 23 for pure hydrogen.

A draw die 4 of tungsten is located in the bottom region of the melting crucible 1. Said draw die is composed of a draw-die exterior part 7 and a mandrel 9.

The annular exterior part 7 of the draw die is inserted into the bottom region of the melting crucible 1 and is connected to the sidewall of the melting crucible 1. It defines a circular round flow constriction 12 in the central axis 26 and a downwardly adjoining dome-shaped cavity. The mandrel 9 which is substantially shaped as a downwardly tapering truncated cone with a dome-shaped upper side extends into the cavity. A flow channel 14, in which the flow constriction 12 terminates and which extends from there via the dome-shaped upper side of the mandrel 9 to the outside and is subsequently slightly tapering downwards along the frustoconical mandrel section up to the nozzle outlet 25, remains between the mandrel 9 and the exterior part 7.

The soft quartz glass mass 27 passes via the flow constriction 12 into the flow channel 14 and is guided via said channel up to the nozzle outlet 25 and is drawn off as a tubular strand 5 vertically downwards towards the draw axis 26.

The mandrel 9 of the draw die 4 is connected to a holding tube 11 of tungsten that extends through the crucible interior 17 and is guided via the upper cover 18 out of said interior. Apart from holding the mandrel 9, the holding tube 11 also serves to supply a process gas for setting a predetermined blowing pressure in the inner bore 25 of the tubular strand 5. The upper end of the holding tube 11 that projects out of the melting furnace is connected to a schematically illustrated height adjusting and displacing means 28 that, apart from the height adjustment of the mandrel 9, also permits a free displacement in lateral direction, as outlined by the directional arrows 29. For an improved centering of the holding tube 11 and of the mandrel 9, centering fingers 20 are provided in the region of the flow constriction 12, the centering fingers 20 extending from the exterior part 7 of the draw die up to the holding tube 11.

The inner diameter of the melting crucible 1 is 400 mm, the minimum diameter of the circular flow constriction 12 is 50 mm, and the maximum outer diameter of the mandrel 9 in the region of its dome-shaped upper side is 360 mm. A tubular strand 5 with an inner diameter of 190 mm and an outer diameter of 210 mm is drawn.

Figure 2:
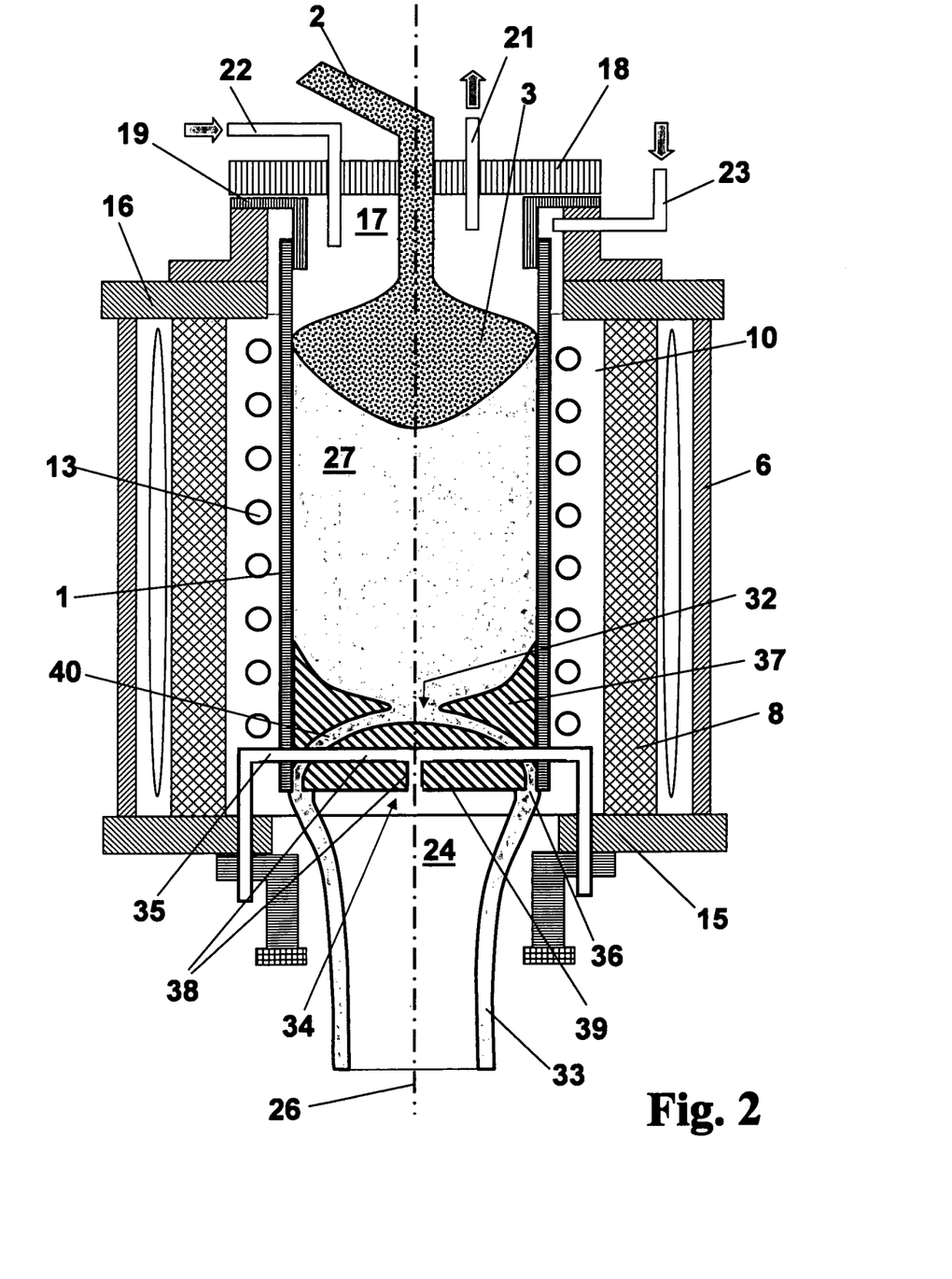
FIG. 2 a melting furnace with a draw die according to the invention in a further embodiment, in a schematic illustration.

FIG. 2 schematically shows a drawing furnace with a modification of the draw die 34 within the scope of the invention.

If the same reference numerals are used as in FIG. 1, constructionally identical or equivalent components and parts of the apparatus are thereby designated, as have been explained above in more detail with reference to the description of the first embodiment of the drawing furnace according to the invention.

The draw die 34 is composed of an exterior part 37 of the draw die and of a mandrel 39, both members consisting of tungsten. The annular exterior part 37 of the draw die is inserted into the bottom region of the melting crucible 1 and connected to the sidewall. It defines a circular flow constriction 32 in the central axis 26 and a downwardly adjoining dome-shaped cavity. The mandrel 39 extends inside the cavity and is substantially shaped as a spherical section with a spherical upper side. A flow channel 40 in which the flow constriction 32 terminates and which extends from there via the spherical upper side of the mandrel 39 to the outside up to the nozzle outlet 36 remains between the mandrel 39 and the exterior part 37.

The soft quartz glass mass passes via the flow constriction 32 into the flow channel 40 and is guided via said channel up to the nozzle outlet 36 and is drawn off as a tubular strand 33 vertically downwards in the direction of the draw axis 26. The mandrel 3 of the draw die 34 is held and fixed in the cavity by means of a plurality of hollow webs 35 of tungsten that extend through the exterior part 37 of the draw die and through the wall of the melting crucible 1. These are connected to the gas supply channels 38 that are formed inside the mandrel 39 and terminate in the inner bore 24 of the tubular strand 5. Apart from holding the mandrel 39, the hollow webs 35 thereby also serve to supply a process gas for setting a predetermined blowing pressure in the inner bore 24 of the tubular strand 5.

The inner diameter of the melting crucible 1 is 400 mm, the minimum diameter of the circular flow constriction 12 is 50 mm, and the maximum outer diameter of the mandrel 39 in the region of its dome-shaped upper side is 360 mm. A tubular strand 33 with an inner diameter of 220 mm and an outer diameter of 230 mm is drawn.

Figure 3:
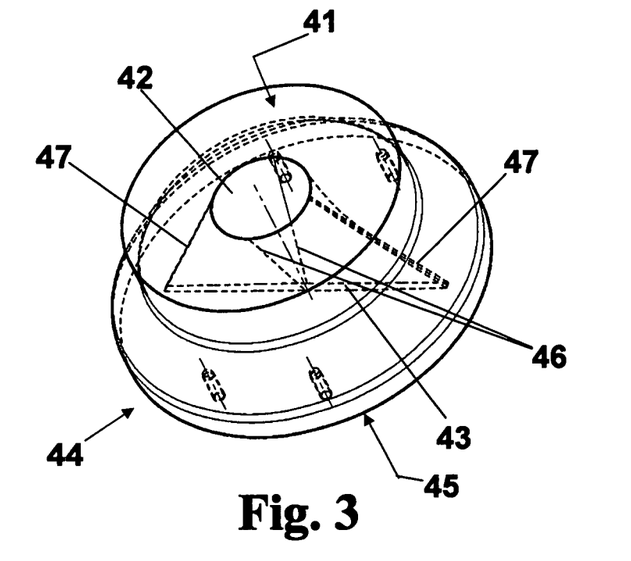
FIG. 3 a technical drawing of a draw die for use in an apparatus and a method according to the invention for drawing a quartz glass plate, in a three-dimensional illustration; and, FIG. 4 the draw die of FIG. 3 in a top view on the flow constriction.

The draw die 44 shown in FIG. 3 serves to produce a quartz glass plate. Its outer diameter is 400 mm and its height 150 mm. Hence, it fits into a melting crucible as has been described above with reference to FIGS. 1 and 2. The draw die 44 has a central circular opening 42 on its upper side 41 with a diameter of 55 mm (not plotted true to scale in FIG. 3). It serves as a flow constriction within the meaning of the invention and passes in the direction towards the bottom side 45 continuously into an elongated draw gap 43 with a gap width of 8 mm and a length of 315 mm. The broken lines 46; 47 outline the boundaries of the flow channel needed therefor, which on the one hand narrows from the top to the bottom (lines 46) and on the other hand expands from the top to the bottom (lines 47). The quartz glass plate to be produced by using the draw die 44 has a thickness of about 8 mm and a width of about 315 mm in conformity with the dimensions of the draw gap 43.

Figure 4:
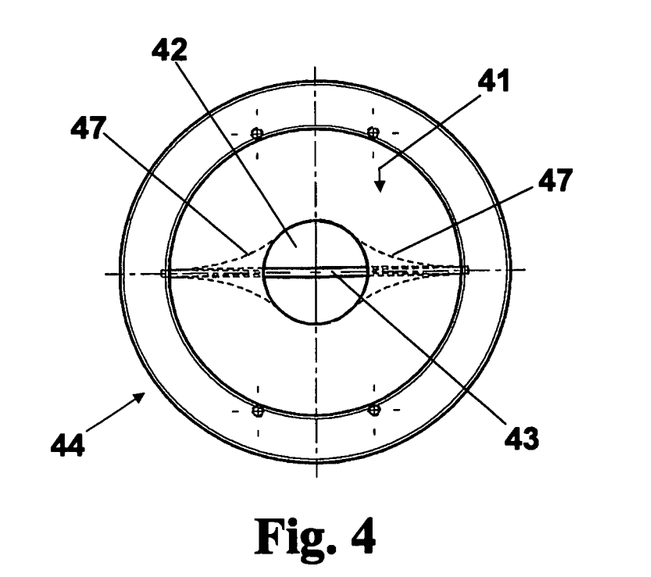

A top view onto the draw die 44 of FIG. 4 shows the central opening 42 serving as a flow constriction and the draw gap 43 arranged thereunder in the direction of the draw axis and the flow channel 47 expanding downwards towards the draw gap 43.

The method of the invention shall now be explained in more detail with reference to an embodiment and FIG. 1.

$SiO_2$ granules 3 are continuously fed via the supply nozzles 2 into the melting crucible 1 and are heated therein to a temperature of about 2100° C. to 2200° C. A homogeneous, bubble-free glass mass 27 is thereby formed in the lower region of the melting crucible 1, with a grain layer of $SiO_2$ particles 3 floating on said glass mass. The softened quartz glass mass 27 is particularly homogeneous in the central region of the melting crucible and flows out of said region via the flow constriction 12 of the draw die 4 and passes from there into the flow channel 14 by means of which it is deflected outwards and supplied to the nozzle outlet 25 from where it is subsequently drawn in the form of the tubular quartz glass strand 5 with the indicated cross-sectional profile downwards and is cut into pieces to the desired length.

In the drawing furnace and the method according to the invention, and despite the drawing of quartz glass tubes with large outer diameters, a pronounced edge flow and the introduction of a marginally homogenized quartz glass mass into the draw die are prevented. This is possible in that the viscous quartz glass mass 27 is forced through a central opening acting as a flow constriction 12. This effects a certain thorough mixing of the quartz glass mass 27 and is conducive to an inflow of the quartz glass mass 27 out of the central region of the melting crucible 1, which is distinguished by a comparatively uniform temperature distribution and a homogeneous chemical composition. This homogeneous quartz glass mass 27 is deflected outwards by the flow constriction 12 via a flow channel 14 and is drawn off downwards as a high-quality quartz glass tube 5; 33.

The invention claimed is:
1. An apparatus for drawing a quartz glass cylinder, the apparatus comprising:
   a melting crucible receiving a $SiO_2$-containing start material that has a crucible interior defined by a sidewall and a bottom region, said crucible comprising;
   a heating device softening the start material;
   a draw die provided in the bottom region of the melting crucible, said draw die having an upper region that faces the crucible interior, and having a flow channel therein defined partially by a flow constriction that widens downwards such that the flow channel has an outlet that has an opening width larger than a width of the flow constriction, such that a first enveloping circle around the flow constriction has a diameter that is not more than 30% of a diameter of a second enveloping circle around the quartz glass strand;
   wherein the draw die has an outlet which is in the form of an annular gap and which is defined by a bottom opening and an interior part of the draw die, with the flow constriction terminating downwards in a cavity and the interior part of the draw die has a mandrel which projects into the cavity while maintaining the flow channel and has a maximum outer circumference greater than the width of the flow constriction; and
   wherein the mandrel is held on at least one web or is centered by means of said web and the web extends from the crucible sidewall to the mandrel.
2. The apparatus according to claim 1, wherein the flow constriction extends in a region around a central axis of the crucible interior.
3. The apparatus according to claim 1, wherein the flow constriction has a cross sectional area that is less than 10% of the radial cross-sectional area of the crucible interior.
4. The apparatus according to claim 1, wherein the first enveloping circle has a diameter that is not more than 20% of the diameter of the second enveloping circle.
5. The apparatus according to claim 1, wherein the web is formed as a hollow web and is connected to a gas supply line in the mandrel supplying gas into the inner bore of the drawn-off quartz glass tube.

6. The apparatus according to claim 1, wherein the flow constriction has a cross sectional area that is less than 5% of the radial cross-sectional area of the crucible interior.

7. An apparatus for drawing a quartz glass cylinder, the apparatus comprising:
   a melting crucible receiving a $SiO_2$-containing start material that has a crucible interior defined by a sidewall and a bottom region, said crucible comprising;
   a heating device softening the start material;
   a draw die provided in the bottom region of the melting crucible, said draw die having an upper region that faces the crucible interior, and having a flow channel therein defined partially by a flow constriction that widens downwards such that the flow channel has an outlet that has an opening width larger than a width of the flow constriction, such that a first enveloping circle around the flow constriction has a diameter that is not more than 30% of a diameter of a second enveloping circle around the quartz glass strand;
   wherein the draw die has an outlet which is in the form of an annular gap and which is defined by a bottom opening and an interior part of the draw die, with the flow constriction terminating downwards in a cavity and the interior part of the draw die has a mandrel which projects into the cavity while maintaining the flow channel and has a maximum outer circumference greater than the width of the flow constriction; and
   wherein the mandrel is held on at least one web or is centered by means of said web and the web extends from the edge of the flow constriction to the mandrel or to an upwardly projecting extension of the mandrel.

8. The apparatus according to claim 7, wherein the flow constriction extends in a region around a central axis of the crucible interior.

9. The apparatus according to claim 7, wherein the flow constriction has a cross sectional area that is less than 10% of the radial cross-sectional area of the crucible interior.

10. The apparatus according to claim 7, wherein the first enveloping circle has a diameter that is not more than 20% of the diameter of the second enveloping circle.

11. The apparatus according to claim 7, wherein the flow constriction has a cross sectional area that is less than 5% of the radial cross-sectional area of the crucible interior.

12. A method for drawing a quartz glass cylinder, said method comprising:
   supplying a $SiO_2$-containing start material to a melting crucible;
   softening said start material into a viscous quartz glass mass;
   pulling said mass vertically downwards as a cylindrical quartz glass cylinder through a draw die which is provided in the bottom region of the melting crucible that has an outlet, and the quartz glass cylinder is cut therefrom to a length
   wherein the viscous quartz glass mass is drawn through a flow constriction which is provided in an upper region of the draw die facing the crucible interior and that widens downwards via a flow channel leading to the outlet;
   wherein the outlet has an opening width greater than the width of the flow constriction and;
   wherein a first enveloping circle around the flow constriction has a diameter that is not more than 30% of the diameter of a second enveloping circle around the quartz glass cylinder to be drawn off;
   wherein the draw die has an outlet which is in the form of an annular gap and is defined by a bottom opening and an interior part of the draw die, the viscous quartz glass mass passing via the flow constriction downwards into a cavity into which a mandrel projects while maintaining the flow channel, said mandrel having a maximum outer circumference greater than the width of the flow constriction; and
   wherein the mandrel is held on at least one web or is centered by means of said web and the web extends from the crucible sidewall to the mandrel.

13. The method according to claim 12, wherein the flow constriction extends in a region around a central axis of the crucible interior.

14. The method according to claim 12, wherein the flow constriction has a cross sectional area that is less than 10% of the radial cross-sectional area of the crucible interior.

15. The method according to claim 12, wherein the web is formed as a hollow web and is connected to a gas supply line in the mandrel supplying gas into the inner bore of the drawn-off quartz glass strand.

16. The method according to claim 12, wherein the flow constriction has a cross sectional area that is less than 5% of the radial cross-sectional area of the crucible interior.

17. A method for drawing a quartz glass cylinder, said method comprising:
   supplying a $SiO_2$-containing start material to a melting crucible;
   softening said start material into a viscous quartz glass mass;
   pulling said mass vertically downwards as a cylindrical quartz glass cylinder through a draw die which is provided in the bottom region of the melting crucible that has an outlet, and the quartz glass cylinder is cut therefrom to a length
   wherein the viscous quartz glass mass is drawn through a flow constriction which is provided in an upper region of the draw die facing the crucible interior and that widens downwards via a flow channel leading to the outlet;
   wherein the outlet has an opening width greater than the width of the flow constriction and;
   wherein a first enveloping circle around the flow constriction has a diameter that is not more than 20% of the diameter of a second enveloping circle around the quartz glass cylinder to be drawn off;
   wherein the mandrel is held on at least one web or is centered by means of said web and the web extends from the edge of the flow constriction to the mandrel or to an upwardly projecting extension of the mandrel.

18. The method according to claim 17, wherein the flow constriction extends in a region around a central axis of the crucible interior.

19. The method according to claim 17, wherein the flow constriction has a cross sectional area that is less than 10% of the radial cross-sectional area of the crucible interior.

20. The method according to claim 17, wherein the flow constriction has a cross sectional area that is less than 5% of the radial cross-sectional area of the crucible interior.

* * * * *